(12) United States Patent
Tao et al.

(10) Patent No.: US 8,139,071 B1
(45) Date of Patent: *Mar. 20, 2012

(54) BUFFERING UNIT TO SUPPORT GRAPHICS PROCESSING OPERATIONS

(75) Inventors: Andrew J. Tao, San Francisco, CA (US); Vimal S. Parikh, Santa Clara, CA (US); Yan Yan Tang, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 1003 days.

This patent is subject to a terminal disclaimer.

(21) Appl. No.: 11/556,021

(22) Filed: Nov. 2, 2006

(51) Int. Cl.
*G06T 1/60* (2006.01)

(52) U.S. Cl. ........ 345/530; 345/419; 345/522; 345/503; 345/531; 345/501

(58) Field of Classification Search .......... 345/530–574; 358/1.16–1.17
See application file for complete search history.

(56) References Cited

U.S. PATENT DOCUMENTS

| | | | |
|---|---|---|---|
| 4,727,363 A | 2/1988 | Ishii | |
| 5,550,765 A | 8/1996 | Bhattacharya et al. | |
| 5,701,516 A * | 12/1997 | Cheng et al. | 710/22 |
| 5,712,999 A * | 1/1998 | Guttag et al. | 711/211 |
| 5,778,413 A * | 7/1998 | Stevens et al. | 711/5 |
| 5,790,130 A * | 8/1998 | Gannett | 345/587 |
| 5,835,925 A * | 11/1998 | Kessler et al. | 711/2 |
| 5,883,642 A * | 3/1999 | Thomas et al. | 345/565 |
| 6,002,412 A | 12/1999 | Schinnerer | |
| 6,029,226 A * | 2/2000 | Ellis et al. | 711/100 |
| 6,075,544 A * | 6/2000 | Malachowsky et al. | 345/545 |
| 6,138,212 A | 10/2000 | Chiacchia et al. | |
| 6,275,243 B1 | 8/2001 | Priem et al. | |
| 6,342,883 B1 * | 1/2002 | Kawaoka | 345/420 |
| 6,362,825 B1 * | 3/2002 | Johnson | 345/522 |
| 6,437,779 B1 * | 8/2002 | Saito et al. | 345/420 |
| 6,446,183 B1 * | 9/2002 | Challenger et al. | 711/170 |
| 6,466,219 B1 | 10/2002 | Shino | |
| 6,469,704 B1 * | 10/2002 | Johnson | 345/553 |
| 6,502,167 B1 * | 12/2002 | Tanaka et al. | 711/114 |
| 6,593,932 B2 | 7/2003 | Porterfield | |
| 6,628,292 B1 * | 9/2003 | Ashburn et al. | 345/565 |
| 6,629,204 B2 * | 9/2003 | Tanaka et al. | 711/114 |

(Continued)

OTHER PUBLICATIONS

Tang et al., U.S. Appl. No. 11/523,375, filed Sep. 18, 2006 for "Transpose Buffer to Support Graphics Processing Operations." Office Actions mailed Apr. 1, 2009, Oct. 15, 2009, Feb. 2, 2010, Aug. 3, 2010, Feb. 1, 2011.

*Primary Examiner* — Andrew Wang
*Assistant Examiner* — Abderrahim Merouan
(74) *Attorney, Agent, or Firm* — Cooley LLP (57) ABSTRACT

An apparatus and method for buffering graphics data are described. In one embodiment, a graphics processing apparatus includes a storage unit and a reorder control unit that is connected to the storage unit. The reorder control unit is configured to coordinate storage of vertex attributes in the storage unit so as to convert the vertex attributes from an initial order to a modified order. The reorder control unit is configured to identify a subset of the vertex attributes to be stored within a common range of addresses in the storage unit, and the reorder control unit is configured to access the storage unit such that the subset of the vertex attributes is written into the storage unit substantially in parallel.

7 Claims, 7 Drawing Sheets

U.S. PATENT DOCUMENTS

| | | | |
|---|---|---|---|
| 6,631,423 B1 * | 10/2003 | Brown et al. | 719/323 |
| 6,643,754 B1 * | 11/2003 | Challenger et al. | 711/171 |
| 6,711,595 B1 * | 3/2004 | Anantharao | 707/206 |
| 6,728,851 B1 * | 4/2004 | Estakhri et al. | 711/168 |
| 6,756,987 B2 * | 6/2004 | Goyins et al. | 345/540 |
| 6,784,894 B2 * | 8/2004 | Schimpf et al. | 345/581 |
| 6,819,334 B1 | 11/2004 | Owada et al. | |
| 6,903,737 B2 | 6/2005 | Knittel | |
| 6,947,047 B1 | 9/2005 | Moy et al. | |
| 7,394,465 B2 | 7/2008 | Toni | |
| 7,474,313 B1 * | 1/2009 | Bittel et al. | 345/531 |
| 7,492,368 B1 * | 2/2009 | Nordquist et al. | 345/502 |
| 7,526,024 B2 | 4/2009 | Kumar et al. | |
| 7,557,810 B2 * | 7/2009 | Brown et al. | 345/522 |
| 7,564,456 B1 * | 7/2009 | Lindholm et al. | 345/426 |
| 2002/0024522 A1 * | 2/2002 | Schimpf et al. | 345/519 |
| 2002/0038415 A1 | 3/2002 | Zandveld et al. | |
| 2002/0055081 A1 * | 5/2002 | Hughes et al. | 433/24 |
| 2002/0109690 A1 | 8/2002 | Champion et al. | |
| 2003/0018878 A1 * | 1/2003 | Dorward et al. | 711/216 |
| 2003/0028740 A1 * | 2/2003 | Challenger et al. | 711/170 |
| 2004/0155883 A1 | 8/2004 | Ju et al. | |
| 2004/0168175 A1 * | 8/2004 | Anantharao | 719/315 |
| 2004/0201592 A1 | 10/2004 | Huang | |
| 2005/0036378 A1 * | 2/2005 | Kawaguchi et al. | 365/202 |
| 2005/0055526 A1 * | 3/2005 | Challenger et al. | 711/170 |
| 2005/0132040 A1 * | 6/2005 | Ellis et al. | 709/223 |
| 2010/0271369 A1 * | 10/2010 | Chang et al. | 345/423 |

\* cited by examiner

BUFFERING UNIT TO SUPPORT GRAPHICS PROCESSING OPERATIONS

BRIEF DESCRIPTION OF THE INVENTION

The invention relates generally to graphics processing. More particularly, the invention relates to an apparatus and method for buffering graphics data to support graphics processing operations.

BACKGROUND OF THE INVENTION

In conventional graphics processing systems, an object to be displayed is typically represented as a set of one or more graphics primitives. Examples of graphics primitives include one-dimensional graphics primitives, such as lines, and two-dimensional graphics primitives, such as polygons. Typically, a graphics primitive is defined by a set of vertices each having a set of vertex attributes. For example, a graphics primitive can be a triangle that is defined by three different vertices, and each of the vertices can have up to 128 different vertex attributes, such as spatial coordinates, color components, fog components, normal vectors, specularity components, and texture coordinates.

Conventional graphics processing systems are typically implemented using a graphics pipeline having multiple pipeline stages. During operation of the graphics pipeline, one pipeline stage can perform a set of graphics processing operations on vertex attributes, and can then issue the vertex attributes for further processing by another pipeline stage. This seemingly straightforward routing of vertex attributes can quickly become complex if various pipeline stages have different processing requirements with respect to the vertex attributes. For example, one pipeline stage can operate on vertex attributes that are in one particular order, while another pipeline stage can operate on the vertex attributes that are in a different order. A further complication can occur if vertex attributes issued by one pipeline stage are stored in a memory, such as a Dynamic Random Access Memory ("DRAM"), pending retrieval of the vertex attributes for further processing by another pipeline stage. In particular, a DRAM typically permits memory access in increments of a particular byte size and for particular ranges of addresses. Unfortunately, vertex attributes as issued by a pipeline stage may not be arranged in a manner that is conducive to efficient memory access and, thus, can require an undesirable number of memory accesses for storage in the DRAM. As a result of these complications, it can be challenging to route vertex attributes while reducing congestion and achieving a desired level of throughput.

It is against this background that a need arose to develop the apparatus and method described herein.

SUMMARY OF THE INVENTION

In one aspect, the invention relates to a graphics processing apparatus. In one embodiment, the graphics processing apparatus includes a storage unit and a reorder control unit that is connected to the storage unit. The reorder control unit is configured to coordinate storage of vertex attributes in the storage unit so as to convert the vertex attributes from an initial order to a modified order. The reorder control unit is configured to identify a subset of the vertex attributes to be stored within a common range of addresses in the storage unit, and the reorder control unit is configured to access the storage unit such that the subset of the vertex attributes is written into the storage unit substantially in parallel.

In another embodiment, the graphics processing apparatus includes a buffering unit configured to convert vertex attributes from an initial order to a modified order. The buffering unit includes a storage unit having a memory layout represented as multiple partitions. The buffering unit also includes a reorder control unit that is connected to the storage unit. The reorder control unit is configured to perform a coalesce check to determine whether a subset of the vertex attributes belongs to a common partition among the partitions, and the reorder control unit is configured to issue a single write request to the storage unit if the subset of the vertex attributes passes the coalesce check.

In another aspect, the invention relates to a graphics processing method. In one embodiment, the graphics processing method includes receiving vertex attributes having an initial order and mapping the vertex attributes onto addresses in a storage unit so as to covert the vertex attributes to a modified order. The graphics processing method also includes identifying a subset of the vertex attributes that is mapped onto a common range of addresses in the storage unit. The graphics processing method further includes issuing a single write request to the storage unit such that the subset of the vertex attributes is written into the common range of addresses substantially in parallel.

Advantageously, certain embodiments of the invention operate in accordance with an improved technique for buffering graphics data to support graphics processing operations. In particular, the improved technique allows efficient routing of vertex attributes with reduced congestion and a higher level of throughput.

Other aspects and embodiments of the invention are also contemplated. The foregoing summary and the following detailed description are not meant to restrict the invention to any particular embodiment but are merely meant to describe some embodiments of the invention.

BRIEF DESCRIPTION OF THE DRAWINGS

For a better understanding of the nature and objects of some embodiments of the invention, reference should be made to the following detailed description taken in conjunction with the accompanying drawings, in which.

Like reference numerals are used to refer to corresponding components of the drawings.

DETAILED DESCRIPTION

Figure 1:
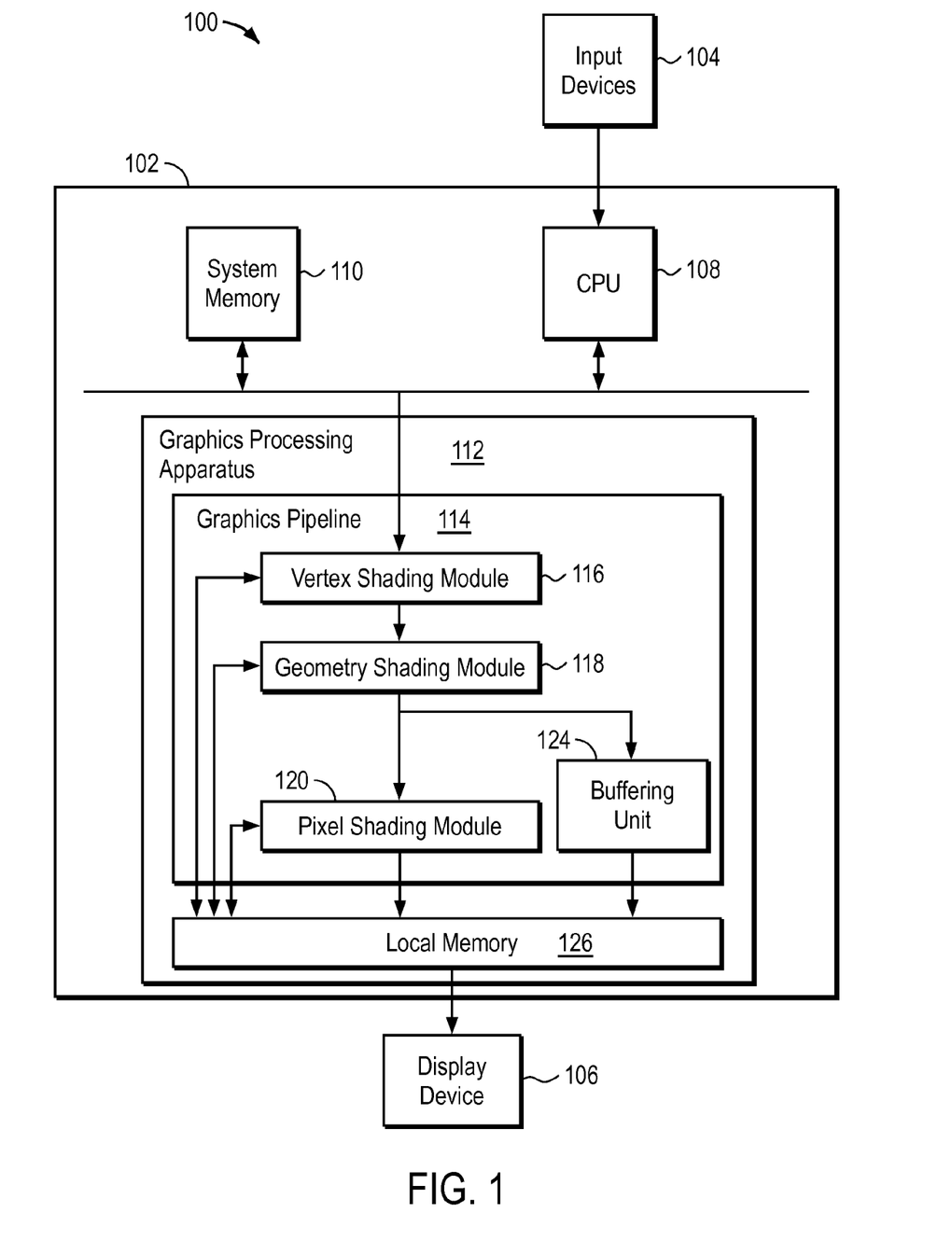
FIG. 1 illustrates a computer system that is implemented in accordance with an embodiment of the invention.

FIG. 1 illustrates a computer system 100 that is implemented in accordance with an embodiment of the invention. The computer system 100 includes a computer 102, which can be, for example, a desktop computer, a server computer, a laptop computer, a palm-sized computer, a tablet computer, a game console, a portable wireless terminal such as a personal digital assistant or a cellular telephone, a computer-based simulator, or any other device with data processing capability. As illustrated in FIG. 1, the computer 102 is connected to a set of input devices 104, which can include, for example, a keyboard and a mouse. The computer 102 is also connected to a display device 106, which can be, for example, a television set, a Cathode Ray Tube ("CRT") monitor, or a Liquid Crystal Display ("LCD") monitor.

The computer 102 includes a Central Processing Unit ("CPU") 108, which is connected to a system memory 110 over a bus 122. The system memory 110 can be implemented using a Random Access Memory ("RAM") and a Read-Only Memory ("ROM"). As illustrated in FIG. 1, the computer 102 also includes a graphics processing apparatus 112 that is connected to the CPU 108 and the system memory 110 over the bus 122. The graphics processing apparatus 112 can be, for example, a Graphics Processing Unit ("GPU").

In the illustrated embodiment, the graphics processing apparatus 112 receives a set of vertices defining an object to be displayed, and the graphics processing apparatus 112 performs a number of graphics processing operations on the vertices. The graphics processing apparatus 112 includes a graphics pipeline 114, which includes a number of graphics processing modules that are connected to one another and that form different pipeline stages. In particular, the graphics pipeline 114 includes a vertex shading module 116, a geometry shading module 118, and a pixel shading module 120, which can be implemented using computational units that execute shading programs. While three graphics processing modules are illustrated in FIG. 1, it is contemplated that the graphics pipeline 114 can include more or less graphics processing modules, depending on the particular implementation. It is also contemplated that these graphics processing modules can be combined, sub-divided, or reordered for another implementation.

Still referring to FIG. 1, the graphics processing apparatus 112 also includes a local memory 126 that is connected to the graphics pipeline 114. The local memory 126 can be, for example, a frame buffer that is implemented using a RAM, such as a DRAM. In the illustrated embodiment, the local memory 126 permits memory access in increments of a particular byte size, such as 128 bytes or 256 bytes, and for particular ranges of addresses, such as addresses within a single DRAM page. As can be appreciated, the particular byte size for accessing the local memory 126 typically corresponds to a memory transfer bandwidth of the local memory 126. While a single local memory is illustrated in FIG. 1, it is contemplated that multiple local memories can be included for another implementation.

During operation of the graphics pipeline 114, vertex attributes are routed through the graphics pipeline 114, and are operated upon by successive pipeline stages. In particular, one pipeline stage performs a set of graphics processing operations on the vertex attributes, and then issues the vertex attributes for further processing by another pipeline stage. Different pipeline stages typically have different processing requirements with respect to the vertex attributes. For example, the geometry shading module 118 can operate on the vertex attributes that are in one particular order, while the pixel shading module 120 can operate on the vertex attributes that are in a different order. As another example, the geometry shading module 118 and the pixel shading module 120 can operate on different subsets of the vertex attributes. Ultimately, the pixel shading module 120 produces a set of pixels that represent an object to be displayed, and the pixel shading module 120 then issues the pixels to the local memory 126, which stores the pixels pending display using the display device 106.

When routing vertex attributes through the graphics pipeline 114, it can be desirable to store a copy or some other representation of the vertex attributes in the local memory 126. As illustrated in FIG. 1, vertex attributes are routed from the geometry shading module 118 to the pixel shading module 120, and, at the same time, some or all of the vertex attributes are routed to the local memory 126 for storage. Depending on the particular implementation, it is contemplated that routing of vertex attributes to the local memory 126 can occur from another point along the graphics pipeline 114. Vertex attributes that are stored in the local memory 126 can be subsequently retrieved and fed back at one or more points along the graphics pipeline 114. For example, the vertex attributes can be fed back to the vertex shading module 116, the geometry shading module 118, or the pixel shading module 120. Accordingly, storage of vertex attributes in the local memory 126 increases efficiency of the graphics pipeline 114 by avoiding re-computing the same vertex attributes that are required for subsequent graphics processing operations.

In the illustrated embodiment, the graphics pipeline 114 includes a buffering unit 124, which is connected between the geometry shading module 118 and the local memory 126. The buffering unit 124 buffers vertex attributes en route to the local memory 126. As received by the buffering unit 124, vertex attributes are arranged in accordance with processing requirements of the pixel shading module 120. In particular, the vertex attributes are arranged in groups according to a per-vertex arrangement. For example, during one clock cycle, the buffering unit 124 can receive one group of vertex attributes of different types for a particular vertex, and, during another clock cycle, the buffering unit 124 can receive another group of vertex attributes of different types for the same vertex or a different vertex. However, this initial arrangement of the vertex attributes may not be appropriate if the vertex attributes are to be fed back for further processing by the vertex shading module 116 or the geometry shading module 118. Moreover, this initial arrangement of the vertex attributes may not be conducive to efficient memory access to the local memory 126 and, thus, can require an undesirable number of memory accesses for storage in the local memory 126.

Advantageously, the buffering unit 124 coordinates storage of vertex attributes within the buffering unit 124 so as to effectively convert the vertex attributes into a modified arrangement that is appropriate for further processing and that allows efficient memory access to the local memory 126. As further described below, the buffering unit 124 performs efficient reordering of vertex attributes by reducing the number of clock cycles required to accomplish such reordering. Moreover, the buffering unit 124 promotes efficient use of the memory transfer bandwidth of the local memory 126 by coalescing vertex attributes to be stored within a common range of addresses in the local memory 126. Accordingly, the buffering unit 124 allows efficient transfer of vertex attributes to the local memory 126 by reducing the number of clock cycles required to accomplish such transfer. For example, the buffering unit 124 can reorder vertex attributes for different vertices, and the buffering unit 124 can then coalesce the reordered vertex attributes within a single group exiting the buffering unit 124. By operating in such manner, the buffering unit 124 allows routing of vertex attributes between the graphics pipeline 114 and the local memory 126, while reducing congestion and achieving a desired level of throughput.

Figure 2:
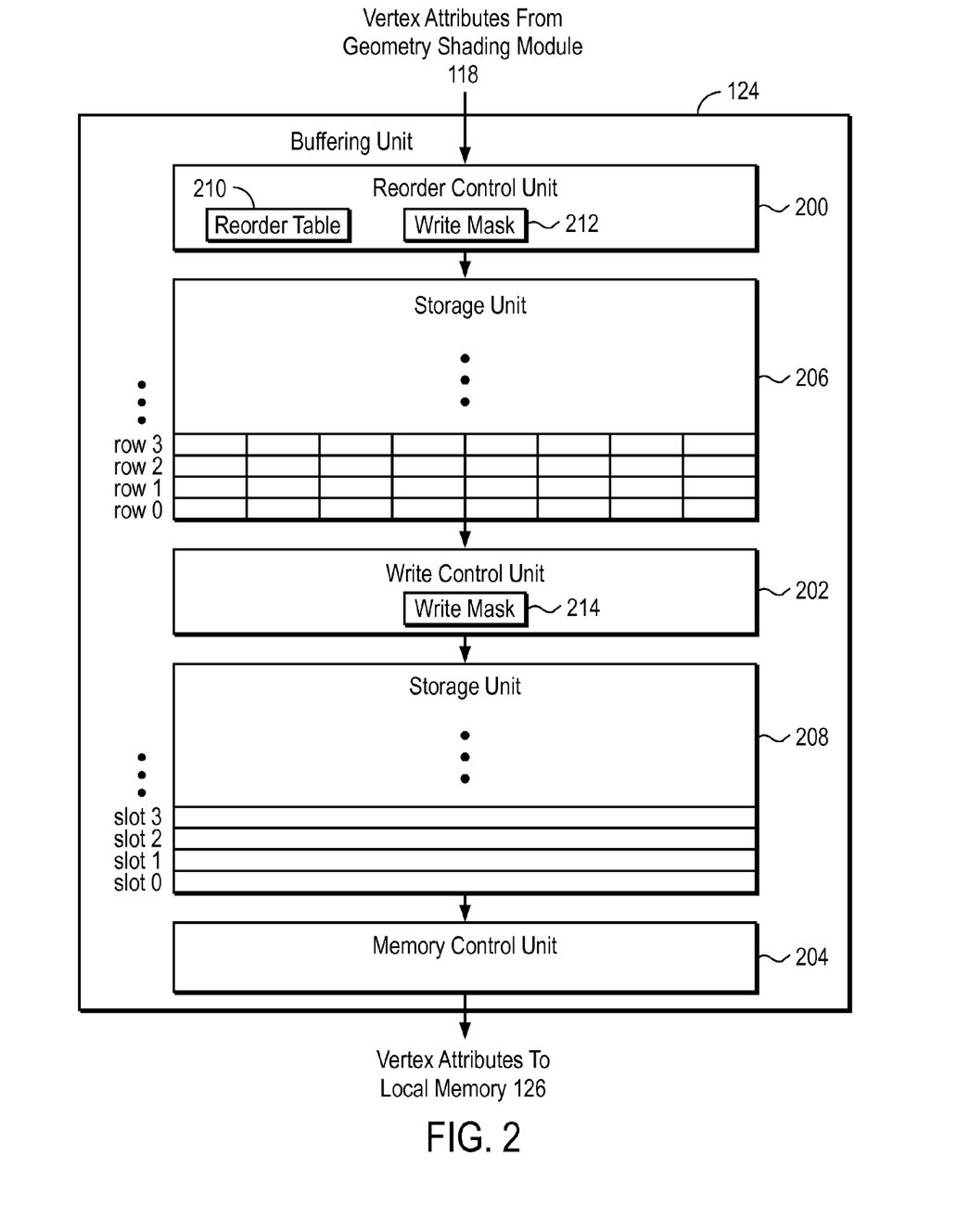
FIG. 2 illustrates a buffering unit that is implemented in accordance with an embodiment of the invention.

The foregoing provides an overview of an embodiment of the invention. Attention next turns to FIG. 2, which illustrates the buffering unit 124 that is implemented in accordance with an embodiment of the invention. Referring to FIG. 2, the buffering unit 124 includes a reorder control unit 200, a write control unit 202, and a memory control unit 204. The buffering unit 124 also includes a storage unit 206, which is connected between the reorder control unit 200 and the write control unit 202. The buffering unit 124 further includes a storage unit 208, which is connected between the write control unit 202 and the memory control unit 204.

In the illustrated embodiment, the reorder control unit 200 coordinates storage of vertex attributes in the storage unit 206 so as to convert the vertex attributes from an initial order to a modified order. As illustrated in FIG. 2, the reorder control unit 200 includes a reorder table 210, which maps the vertex attributes onto addresses in the storage unit 206 so as to reorder the vertex attributes. The reorder table 210 can be implemented using a RAM. As illustrated in FIG. 2, the reorder control unit 200 also includes a write mask 212, which allows selective access to particular addresses in the storage unit 206. Other functionality of the reorder control unit 200 can be implemented in any suitable manner, such as using crossbar switches and related addressing and control circuitry.

As illustrated in FIG. 2, the storage unit 206 has a memory layout represented as multiple partitions, including partitions labeled as row0 through row3. In accordance with a logical representation of the storage unit 206, the partitions correspond to rows of a matrix, such that vertex attributes to be reordered are written into the storage unit 206 as row data, and reordered vertex attributes are subsequently read from the storage unit 206 as row data. Still referring to FIG. 2, each of the partitions includes multiple slots having respective addresses. For example, row0 includes 8 slots having addresses 0 through 7, and row1 includes 8 slots having addresses 8 through 15. In the illustrated embodiment, the storage unit 206 can be, for example, a single memory bank that is implemented using a RAM. However, it is also contemplated that the storage unit 206 can be implemented using multiple memory banks. Moreover, while not illustrated in FIG. 2, it is contemplated that the partitions of the storage unit 206 can be logically segregated in accordance with a double buffering scheme, thereby allowing writing of vertex attributes into one partition, while vertex attributes are read from another partition.

During reordering of vertex attributes, the reorder control unit 200 references the reorder table 210 to perform a coalesce check. In accordance with the coalesce check, the reorder control unit 200 determines whether particular ones of the vertex attributes are to be stored within a common range of addresses in the storage unit 206 and, therefore, belong to a common partition of the storage unit 206. If those vertex attributes pass the coalesce check, the reorder control unit 200 accesses the storage unit 206 such that those vertex attributes are written into the common partition substantially in parallel. Through use of the write mask 212, the reorder control unit 200 can issue a single write request to direct storage of those vertex attributes within respective slots of the common partition. On the other hand, if those vertex attributes do not pass the coalesce check, the reorder control unit 200 accesses the storage unit 206 such that those vertex attributes are sequentially written into different partitions of the storage unit 206. In particular, the reorder control unit 200 can issue multiple write requests to direct storage of those vertex attributes within the different partitions. By operating in such manner, the reorder control unit 200 can efficiently reorder vertex attributes with a reduced number of memory accesses to the storage unit 206.

Still referring to FIG. 2, the write control unit 202 coordinates retrieval of vertex attributes from the storage unit 206. The write control unit 202 also coordinates storage of the vertex attributes in the storage unit 208 so as to distribute or pack the vertex attributes into an arrangement that is appropriate for further processing and that allows efficient memory access to the local memory 126. As illustrated in FIG. 2, the write control unit 202 includes a write mask 214, which allows selective access to particular addresses in the storage unit 208. Other functionality of the write control unit 202 can be implemented in any suitable manner, such as using crossbar switches and related addressing and control circuitry.

As illustrated in FIG. 2, the storage unit 208 has a memory layout represented as multiple partitions, including partitions labeled as slot0 through slot3. Each of the partitions has a memory size corresponding to the memory transfer bandwidth of the local memory 126, and holds data to be stored within a particular range of addresses in the local memory 126, such as a particular range of addresses within a single DRAM page. For example, slot0 can hold up to 128 bytes of data to be stored within a particular range of addresses in one DRAM page, and slot1 can hold up to 128 bytes of data to be stored within a particular range of addresses in another DRAM page. In the illustrated embodiment, the storage unit 208 can be, for example, a single memory bank that is implemented using a RAM. However, it is also contemplated that the storage unit 208 can be implemented using multiple memory banks.

During packing of vertex attributes, the write control unit 202 references addresses at which the vertex attributes are to be stored in the local memory 126. In accordance with those addresses, the write control unit 202 accesses the storage unit 208 so as to distribute the vertex attributes within appropriate partitions of the storage unit 208. In such manner, the write control unit 202 can coalesce, within a common partition, particular ones of the vertex attributes to be stored within a common range of addresses in the local memory 126. Through use of the write mask 214, the write control unit 202 can direct storage of those vertex attributes within respective portions of the common partition. In some instances, one or more gaps can be present within the common partition, depending on a stride requirement. For other ones of the vertex attributes, the write control unit 202 can access the storage unit 208 such that those vertex attributes are distributed within different partitions of the storage unit 208.

Still referring to FIG. 2, the memory control unit 204 coordinates transfer of vertex attributes from the storage unit 208 to the local memory 126 on a per-partition basis. In particular, the memory control unit 204 tracks an extent of data loading within each of the partitions of the storage unit 208. Once a particular partition is deemed to be fully loaded with vertex attributes, the memory control unit 204 issues a single write request to direct storage of those vertex attributes in the local memory 126. The memory control unit 204 can account for a stride requirement when tracking an extent of data loading, such that a particular partition can be deemed to be fully loaded despite the presence of one or more gaps within that partition. By operating in such manner, the memory control unit 204 can efficiently transfer vertex attributes with a reduced number of memory accesses to the local memory 126. The memory control unit 204 can be implemented in any suitable manner, such as using addressing and control circuitry.

Additional aspects and advantages of the buffering unit 124 can be understood with reference to FIG. 3 through FIG. 7, which illustrate various operational scenarios of the buffering unit 124 in accordance with an embodiment of the invention.

Figure 3:
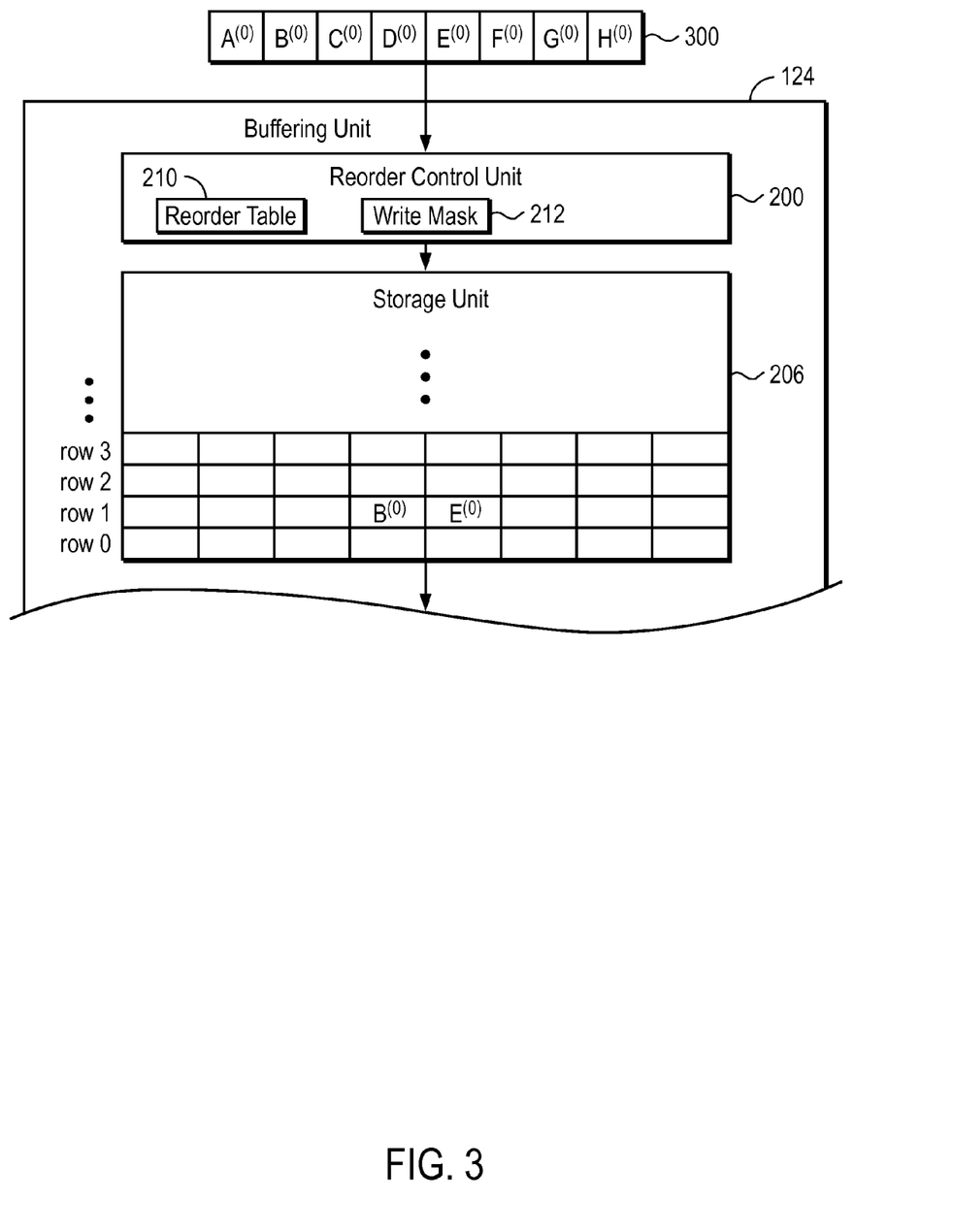
FIG. 3 through FIG. 7 illustrate various operational scenarios of the buffering unit of FIG. 2, according to an embodiment of the invention.

Attention first turns to FIG. 3, which illustrates writing of a group of vertex attributes 300 into the storage unit 206 during one operational stage. In the illustrated embodiment, the group of vertex attributes 300 includes eight different vertex attributes $A^{(0)}$ through $H^{(0)}$ for a common vertex $V_0$. By referencing the reorder table 210, the reorder control unit 200 identifies vertex attributes $B^{(0)}$ and $E^{(0)}$ as belonging to a common partition of the storage unit 206, namely row1. Referring to FIG. 3, the reorder control unit 200 issues a single write request to the storage unit 206, such that, during one clock cycle, the vertex attributes $B^{(0)}$ and $E^{(0)}$ are written into respective slots of row1.

Figure 4:
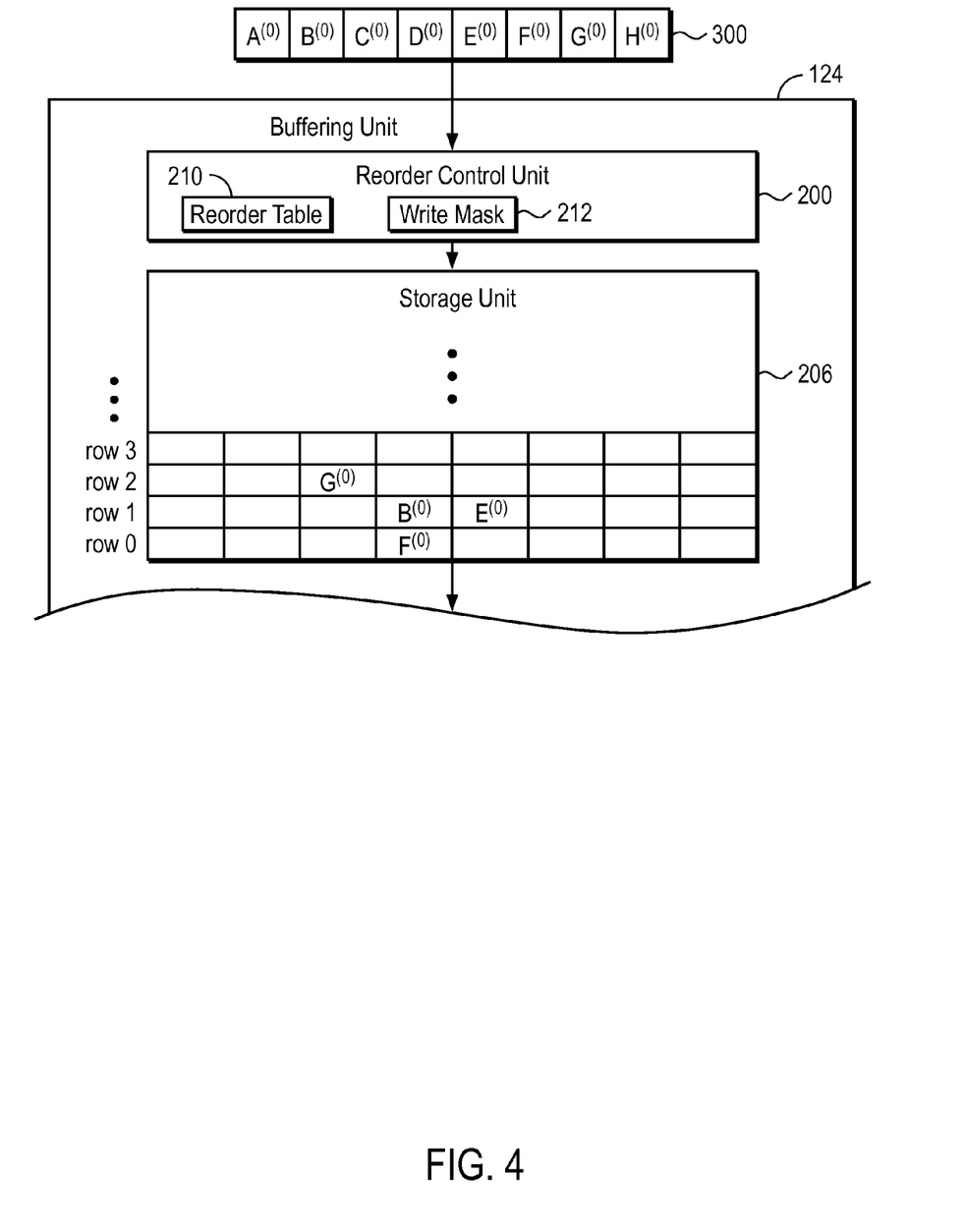

FIG. 4 illustrates writing of the group of vertex attributes 300 into the storage unit 206 during subsequent operational stages. In the illustrated embodiment, vertex attributes $F^{(0)}$ and $G^{(0)}$ belong to different partitions of the storage unit 206, namely row0 and row2. Referring to FIG. 4, the reorder control unit 200 issues multiple write requests to the storage unit 206, such that the vertex attributes $F^{(0)}$ and $G^{(0)}$ are written into row0 and row2, respectively. In particular, during one clock cycle, the vertex attribute $F^{(0)}$ is written into row0, and, during another clock cycle, the vertex attribute $G^{(0)}$ is written into row2. In the illustrated embodiment, remaining ones of the group of vertex attributes 300 are not required for further processing, and can be simply discarded.

Figure 5:
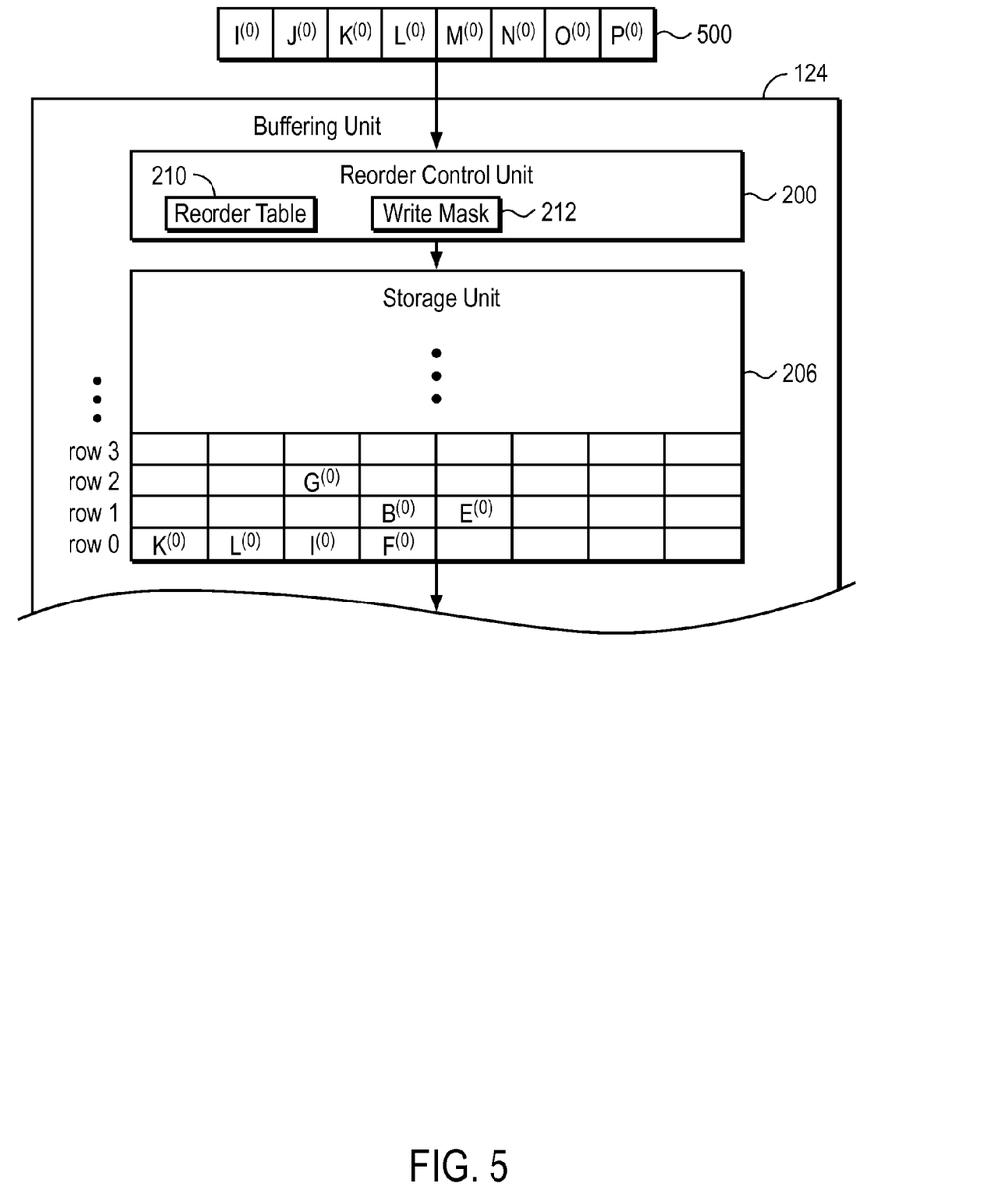

FIG. 5 illustrates writing of another group of vertex attributes 500 into the storage unit 206 during a subsequent operational stage. In the illustrated embodiment, the group of vertex attributes 500 includes eight different vertex attributes $I^{(0)}$ through $P^{(0)}$ for the vertex $V_0$. By referencing the reorder table 210, the reorder control unit 200 identifies vertex attributes $I^{(0)}$, $K^{(0)}$, and $L^{(0)}$ as belonging to a common partition of the storage unit 206, namely row0. Referring to FIG. 3, the reorder control unit 200 issues a single write request to the storage unit 206, such that, during one clock cycle, the vertex attributes $I^{(0)}$, $K^{(0)}$, and $L^{(0)}$ are written into respective slots of row0. In the illustrated embodiment, remaining ones of the group of vertex attributes 500 are not required for further processing, and can be simply discarded.

Figure 6:
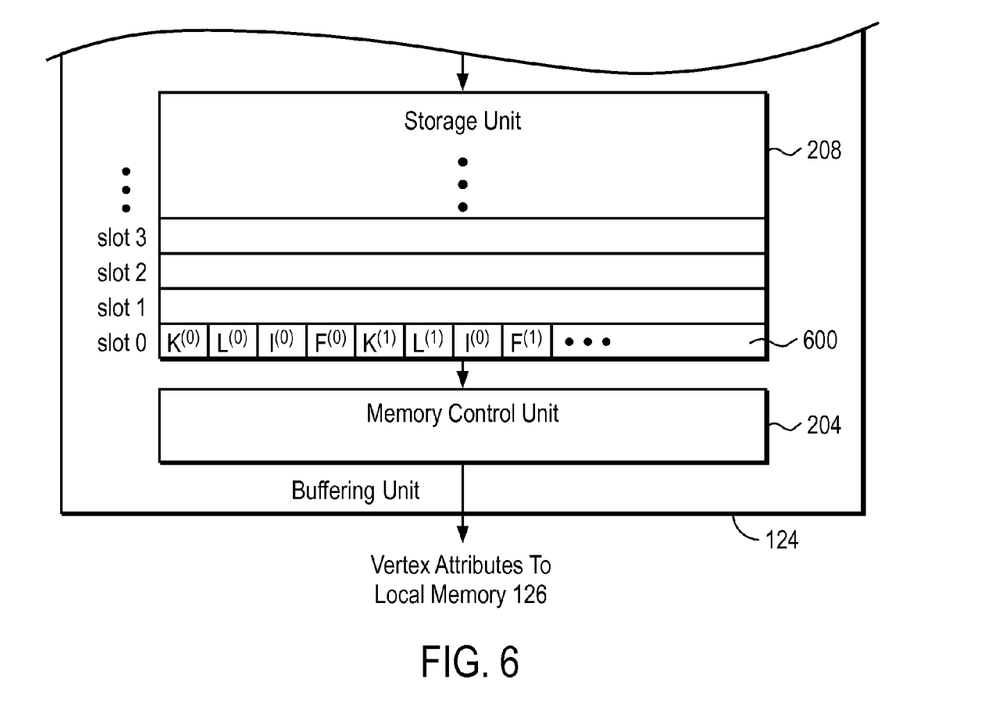

FIG. 6 illustrates packing of a group of vertex attributes 600 within the storage unit 208 in accordance with one operational scenario. In the illustrated embodiment, the group of vertex attributes 600 includes 4 reordered vertex attributes $K^{(0)}$, $L^{(0)}$, $I^{(0)}$, and $F^{(0)}$ for the vertex $V_0$ and 4 reordered vertex attributes $K^{(1)}$, $L^{(1)}$, $I^{(1)}$, and $F^{(1)}$ for a vertex $V_1$, which are coalesced within a common partition of the storage unit 208, namely slot0. Referring to FIG. 6, the memory control unit 204 tracks an extent of data loading within slot0. Once slot0 is deemed to be fully loaded, the memory control unit 204 issues a single write request to transfer the group of vertex attributes 600 to the local memory 126.

Figure 7:
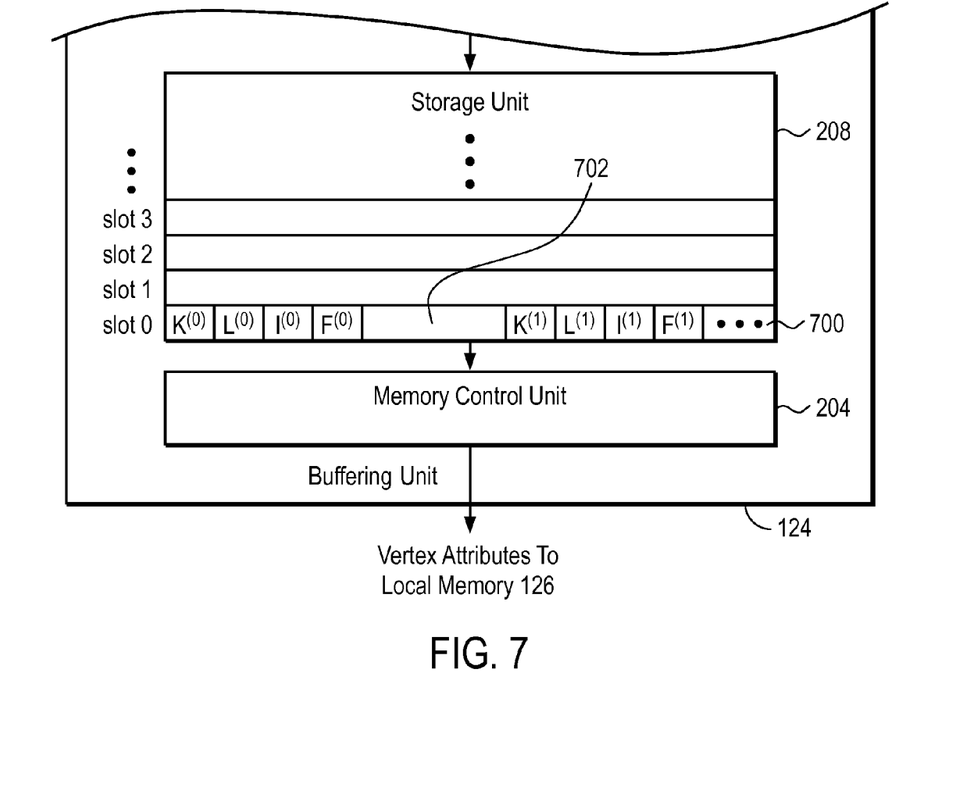

Attention next turns to FIG. 7, which illustrates packing of another group of vertex attributes 700 within the storage unit 208 in accordance with another operational scenario. In the illustrated embodiment, the group of vertex attributes 700 again includes the 4 reordered vertex attributes $K^{(0)}$, $L^{(0)}$, $I^{(0)}$, and $F^{(0)}$ for the vertex $V_0$ and the 4 reordered vertex attributes $K^{(1)}$, $L^{(1)}$, $I^{(1)}$, and $F^{(1)}$ for the vertex $V_1$, which are coalesced within slot0. Here, however, the vertex attributes for the vertex $V_0$ and the vertex attributes for the vertex $V_1$ are separated by a gap 702 in accordance with a stride requirement. Referring to FIG. 7, the memory control unit 204 tracks an extent of data loading within slot0, while accounting for the stride requirement. Once slot0 is deemed to be fully loaded, the memory control unit 204 issues a single write request to transfer the group of vertex attributes 700 to the local memory 126.

Some embodiments of the invention relate to a computer storage product with a computer-readable medium having instructions or computer code thereon for performing various computer-implemented operations. The media and computer code may be those specially designed and constructed for the purposes of the invention, or they may be of the kind well known and available to those having skill in the computer software arts. Examples of computer-readable media include, but are not limited to: magnetic storage media such as hard disks, floppy disks, and magnetic tape; optical storage media such as Compact Disc/Digital Video Discs ("CD/DVDs"), Compact Disc-Read Only Memories ("CD-ROMs"), and holographic devices; magneto-optical storage media such as floptical disks; carrier wave signals; and hardware devices that are specially configured to store and execute program code, such as Application-Specific Integrated Circuits ("ASICs"), Programmable Logic Devices ("PLDs"), and ROM and RAM devices. Examples of computer code include, but are not limited to, micro-code or micro-instructions, machine instructions, such as produced by a compiler, and files containing higher-level instructions that are executed by a computer using an interpreter. For example, an embodiment of the invention may be implemented using Java, C++, or other object-oriented programming language and development tools. Additional examples of computer code include, but are not limited to, control signals, encrypted code, and compressed code.

Some embodiments of the invention can be implemented using computer code in place of, or in combination with, hardwired circuitry. For example, with reference to FIG. 1, various components of the graphics pipeline 114 can be implemented using computer code, hardwired circuitry, or a combination thereof.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, process operation or operations, to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or reordered to form an equivalent method without departing from the teachings of the invention. Accordingly, unless specifically indicated herein, the order and grouping of the operations is not a limitation of the invention.

What is claimed is:

1. A graphics processing apparatus, comprising:
   a storage unit; and
   a reorder control unit connected to the storage unit, the reorder control unit configured to coordinate storage in the storage unit so as to convert from an initial order to a modified order, the reorder control unit configured to group vertex attributes of different types for a common vertex into at least a first group and a second group, the reorder control unit configured to identify the first group to be stored within a first common range of addresses in the storage unit, the reorder control unit configured to identify the second group to be stored within a second common range of addresses in the storage unit, the reorder control unit configured to access the storage unit such that the first group is written into the storage unit substantially in parallel, the reorder control unit configured to access the storage unit such that the second group is written into the storage unit substantially in parallel and subsequent to writing the first group into the storage unit, wherein the storage unit is configured with multiple partitions including respective ranges of addresses.

2. The graphics processing apparatus of claim 1, wherein the reorder control unit is configured to identify the first group as belonging to a common partition among the partitions, and the reorder control unit is configured to access the storage unit such that the first group is written into the common partition substantially in parallel.

3. The graphics processing apparatus of claim 2, wherein the common partition includes multiple slots, and the reorder control unit is configured to access the storage unit such that the first group is written into respective ones of the slots in accordance with the modified order.

4. The graphics processing apparatus of claim 2, wherein the common partition corresponds to a first partition among the partitions, the reorder control unit is configured to identify the second group as belonging to a second partition among the partitions, and the reorder control unit is configured to access the storage unit such that the second group is written into the second partition substantially in parallel.

5. The graphics processing apparatus of claim 2, wherein the reorder control unit is configured to group the vertex attributes of different types for the common vertex into at least the first group, the second group, and a third group that belong to different partitions among the partitions, and the reorder control unit is configured to access the storage unit such that the first group, the second group, and the third group are sequentially written into the different partitions.

6. A graphics processing method, comprising:
receiving vertex attributes of different types for a common vertex, the vertex attributes having an initial order;
mapping the vertex attributes onto addresses in a storage unit so as to covert the vertex attributes to a modified order;
identifying a first subset of the vertex attributes that is mapped onto a first range of addresses in the storage unit;
issuing a first write request to the storage unit such that the first subset of the vertex attributes is written into the first range of addresses substantially in parallel;
identifying a second subset of the vertex attributes that is mapped onto a second range of addresses in the storage unit; and
issuing a second write request to the storage unit such that the second subset of the vertex attributes is written into the second range of addresses substantially in parallel.

7. The graphics processing method of claim 6, wherein the storage unit is configured with multiple partitions having respective ranges of addresses, and identifying the first subset of the vertex attributes includes identifying the first subset of the vertex attributes as belonging to a common partition among the partitions.

* * * * *